United States Patent
Kawano et al.

(10) Patent No.: US 12,291,806 B2
(45) Date of Patent: May 6, 2025

(54) NON-WOVEN FABRIC AND SEPARATOR FOR ELECTROCHEMICAL ELEMENTS

(71) Applicant: JAPAN VILENE COMPANY, LTD., Tokyo (JP)

(72) Inventors: Akihiko Kawano, Toyko (JP); Masanao Tanaka, Tokyo (JP)

(73) Assignee: JAPAN VILENE COMPANY, LTD., Tokyo (JP)

( * ) Notice: Subject to any disclaimer, the term of this patent is extended or adjusted under 35 U.S.C. 154(b) by 354 days.

(21) Appl. No.: 17/288,381

(22) PCT Filed: Nov. 5, 2019

(86) PCT No.: PCT/JP2019/043276
§ 371 (c)(1),
(2) Date: Apr. 23, 2021

(87) PCT Pub. No.: WO2020/100654
PCT Pub. Date: May 22, 2020

(65) Prior Publication Data
US 2021/0381143 A1    Dec. 9, 2021

(30) Foreign Application Priority Data
Nov. 13, 2018 (JP) .................. 2018-213234

(51) Int. Cl.
| | |
|---|---|
| *D04H 1/4382* | (2012.01) |
| *D01D 1/02* | (2006.01) |
| *D01D 5/06* | (2006.01) |
| *D01F 6/06* | (2006.01) |
| *D01F 8/06* | (2006.01) |
| *H01M 50/417* | (2021.01) |
| *H01M 50/443* | (2021.01) |
| *H01M 50/489* | (2021.01) |
| *H01M 50/491* | (2021.01) |
| *H01M 50/494* | (2021.01) |

(52) U.S. Cl.
CPC .......... *D04H 1/43828* (2020.05); *D01D 1/02* (2013.01); *D01D 5/06* (2013.01); *D01F 6/06* (2013.01); *D01F 8/06* (2013.01); *H01M 50/417* (2021.01); *H01M 50/443* (2021.01); *H01M 50/489* (2021.01); *H01M 50/491* (2021.01); *H01M 50/494* (2021.01); *D10B 2321/0211* (2013.01); *D10B 2321/022* (2013.01)

(58) Field of Classification Search
CPC .......... B01D 2239/0233; B01D 39/163; B01D 2239/0407; B01D 2239/0421; B01D 2239/0492; B01D 2239/0636; B01D 2239/064; B01D 2239/12; B01D 2239/1208; D04H 1/43828; D01F 6/06; D01F 8/06; D10B 2321/0211; D10B 2321/022; H01M 50/44; H01M 50/446; H01M 50/417
See application file for complete search history.

(56) References Cited

FOREIGN PATENT DOCUMENTS

| | | | | |
|---|---|---|---|---|
| CN | 102549805 A | * | 7/2012 | ............ H01M 2/145 |
| EP | 1689008 A1 | * | 8/2006 | ............... D04H 1/48 |
| JP | 49073629 A | | 7/1974 | |
| JP | 2001155709 A | * | 6/2001 | ............ H01M 2/162 |
| JP | 2002180330 A | * | 6/2002 | |
| JP | 2003109569 A | | 4/2003 | |
| JP | 2004296356 A | * | 10/2004 | |
| JP | 2004335159 A | | 11/2004 | |
| JP | 2013204154 A | | 10/2013 | |
| JP | 2016110763 A | | 6/2016 | |
| JP | 2017033678 A | | 2/2017 | |
| KR | 20130120113 A | * | 11/2013 | |
| WO | 2018179464 A1 | | 10/2018 | |

OTHER PUBLICATIONS

International Search Report; International Application No. PCT/JP2019/043276; International Filing Date—Nov. 5, 2019; Date of Mailing—Feb. 4, 2020, 6 pages.
Extended European Search Report for EP Application No. 19884992.9; Dated—Jul. 1, 2022; 10 pages.

* cited by examiner

*Primary Examiner* — Jennifer A Gillett
(74) *Attorney, Agent, or Firm* — CANTOR COLBURN LLP

(57) ABSTRACT

It is an object of the present invention to provide a nonwoven fabric having mechanical strength which is hardly cut and broken by an external force, and a separator for electrochemical devices using the nonwoven fabric.
The inventive nonwoven fabric has a sum of tensile strengths by zero-span per basis weight in the machine direction and the cross-machine direction of 6.5N/50 mm or more. Thus, the strength of the constituent fibers of this nonwoven fabric against an external force is high, and this nonwoven fabric has mechanical strength which is hardly cut and broken by an external force.
The separator for electrochemical devices of the present invention is composed of this nonwoven fabric.

14 Claims, No Drawings

NON-WOVEN FABRIC AND SEPARATOR FOR ELECTROCHEMICAL ELEMENTS

CROSS REFERENCE TO RELATED APPLICATIONS

This application is a National Stage application of PCT/JP2019/043276, filed Nov. 5, 2019. This application claims priority to Japanese Application No. 2018-213234, filed Nov. 13, 2018, the entire contents of which are incorporated herein by reference.

TECHNICAL FIELD

The present invention relates to a nonwoven fabric and separator for electrochemical devices.

BACKGROUND OF THE INVENTION

Conventionally, separator have been used between the positive and negative electrodes of electrochemical devices, such as batteries and capacitors. The reason for this is that the separator separates the positive electrode and the negative electrode of the electrochemical devices to prevent short-circuit of the electrochemical devices, and the separator holds the electrolyte solution to smoothly perform the electromotive reaction.

Recently, with the miniaturization and weight reduction of the electronic equipment, the spaces occupied by electrochemical devices which is the power source is also narrowed. However, since the electrochemical devices require performance equal to or higher than that of the conventional electrochemical devices, the volume occupied by the separator must be small.

For example, as a separator satisfying such a request, applicant, "A separator for batteries is non-woven fabrics, comprising: high strength composite polypropylene-based fibers having the tensile strength of 4.5 cN/dtex or more are at least 60 mass % or more (excluding 100 mass %), and superfine fibers having fiber diameter of 4 μm or less are 40 mass % or less (excluding 0 mass %); high-strength composite polypropylene-based fibers are fused, wherein the average 5% modulus strength is 30N/5 cm to 100N/5 cm." (Patent Literature 1) was proposed.

CITATION LIST

Patent Literature

Patent Literature 1: JP 2004-335159

SUMMARY OF THE INVENTION

Problem to be Solved by the Invention

However, in the separator described in Patent Document 1, when manufacturing electrochemical devices by stacking separators and electrode plates and applying pressure, a large force is applied between an edge of the electrode plate and the separator to cut the separator, which may cause short-circuit of the electrochemical device.

This is a problem related to a separator for electrochemical devices, but in addition to the separator for electrochemical devices, there is a possibility that the nonwoven fabric is cut and broken by an external force. For example, when a filter made of a nonwoven fabric is wrapped around a device to attach the filter, tension is applied to the filter, and the filter may be broken.

The present invention has been made under such circumstances, it is an object of the present invention to provide a nonwoven fabric having mechanical strength which is hardly cut and broken by an external force, and a separator for electrochemical devices using the nonwoven fabric.

Means for Solving the Problems

The nonwoven fabric of the present invention contains polyolefin-based composite fusion fibers provided with a fusion component on the fiber surface, and these composite fusion fibers are fused, and the sum of the tensile strengths by zero-span per basis weight in the machine direction and the cross-machine direction is 6.5N/50 mm or more.

The Young's modulus of this polyolefin-based composite fusion fiber is preferably 60 cN/dtex or more. Further, it is preferable that the polyolefin-based composite fusion fiber has the tensile strength of 5.0 cN/dtex or more. Further, the polyolefin-based composite fusion fiber preferably has the elongation of 15% to 35%.

It is preferable that the nonwoven fabric comprising superfine fibers having the average fiber diameter of 4 μm or less.

The maximum pore diameter of this nonwoven fabric is preferably 40 μm or less. In addition, it is preferable that the nonwoven fabric has the machine direction 5% modulus strength of 30N/50 mm to 100N/50 mm. In addition, it is preferable that the nonwoven fabric has the porosity of 45% to 85%. Further, it is preferable that the needle type penetration resistance per basis weight of the nonwoven fabric is 21 gf or more. Further, it is preferable that the cutter type penetration resistance per basis weight of the nonwoven fabric is 21 gf or more. Further, it is preferable that the nonwoven fabric contains inorganic particles.

The separator for electrochemical devices of the present invention is composed of this nonwoven fabric.

This separator for electrochemical devices preferably have the thickness retention ratio of 92% or more.

Effect of the Invention

Since the sum of the tensile strengths by zero-span per basis weight in the machine direction and the cross-machine direction is 6.5N/50 mm or more, the nonwoven fabric has high strength against the external force of the constituent fibers of the nonwoven fabric, and the nonwoven fabric has mechanical strength which is hardly cut and broken by the external force.

Further, since the Young's modulus of this polyolefin-based composite fusion fiber is 60 cN/dtex or more, since this polyolefin-based composite fusion fiber is hardly deformed by pressure, this nonwoven fabric has mechanical strength which is hardly cut and broken by an external force, and this nonwoven fabric is hardly compressed by pressure.

Further, the tensile strength of the polyolefin-based composite fusion fiber is 5.0 cN/dtex or more, since the polyolefin-based composite fusion fiber is hardly broken by an external force, this nonwoven fabric has mechanical strength that is hardly broken by an external force.

Further, since the elongation of the polyolefin-based composite fusion fiber is 15% to 35%, the nonwoven fabric is moderately elongated even when pulled by an external force, and thus has mechanical strength which is hardly broken by an external force.

Further, by including superfine fibers having the average fiber diameter of 4 μm or less in the nonwoven fabric, this nonwoven fabric has a dense structure, and is excellent in various performances such as electrical insulation, separation performance, liquid retention, wiping property, and concealability of the nonwoven fabric.

Further, since the maximum pore diameter of the nonwoven fabric is 40 μm or less, the nonwoven fabric has a dense structure, and is excellent in various performances such as electrical insulation, separation performance, liquid retention, wiping property, and concealability of the nonwoven fabric.

Further, since the 5% modulus strength in the machine direction of the nonwoven fabric is 30N/50 mm to 100N/50 mm, it is difficult to cause a slippage (e.g., a winding slippage) during the manufacture of the nonwoven fabric by providing a certain degree of structural flexibility while ensuring a minimum mechanical strength of the nonwoven fabric.

In addition, since the porosity of this nonwoven fabric is 45% to 85%, this nonwoven fabric has many spaces, and is excellent in various performances such as ion conductivity, gas permeability, liquid permeability, and liquid retention of the nonwoven fabric.

Further, since the needle type penetration resistance per basis weight of this nonwoven fabric is 21 gf or more, this nonwoven fabric has mechanical strength which is hardly broken by an external force.

Further, since the cutter type penetration resistance per basis weight of the nonwoven fabric is 21 gf or more, this nonwoven fabric has mechanical strength which is hardly cut by an external force.

Further, since inorganic particles are contained in this nonwoven fabric, the specific surface area of this nonwoven fabric becomes large, and the surface of this nonwoven fabric becomes a dense structure, and is excellent in various performances such as electrical insulation, separation performance, wiping property, and concealability of the nonwoven fabric.

Further, since the separator for electrochemical devices made of this nonwoven fabric has mechanical strength which is hardly cut and broken by an external force, short-circuit of the electrochemical devices is hardly occurred due to penetration of the separator by a burr of the electrode plate of the electrochemical devices or cutting of the separator by the electrode plate of the electrochemical devices.

Further, since the thickness retention ratio of the separator for electrochemical devices is 92% or more, the structure of the separator for electrochemical devices can be maintained even if an external pressure is applied to the separator for electrochemical devices, so that the separator for electrochemical devices is excellent in the electrolyte solution retention property.

DETAILED DESCRIPTION OF THE INVENTION

[Form for Implementing the Invention]

The nonwoven fabric of the present invention contains polyolefin-based composite fusion fibers provided with a fusion component on the fiber surface, and these composite fusion fibers are fused, and the sum of the tensile strengths by zero-span per basis weight in the machine direction and the cross-machine direction is 6.5N/50 mm or more.

Thus, it has been found that the constituent fibers of the nonwoven fabric have high strength against an external force and has mechanical strength which is hardly cut and broken by an external force.

The reason why the tensile strength by the zero-span of the nonwoven fabric is measured is that a value corresponding to the strength of the constituent fibers of the nonwoven fabric can be measured by measuring the tensile strength by the zero-span of the nonwoven fabric. The reason why the evaluation is made by the sum of the tensile strengths by the zero-span in the machine direction and the cross machine direction is that there is a variation in the orientation of constituent fibers of the nonwoven fabric, and when the tensile strength by the zero-span of the nonwoven fabric is measured in only one direction, the measurement result may deviate by the orientation of the constituent fibers of the nonwoven fabric, but by making the sum of the machine direction and the cross machine direction, a deviation in the measurement result by the orientation of the constituent fibers of the nonwoven fabric can be reduced.

Further, the reason why the tensile strength by zero-span per basis weight is evaluated is that, in general, the number of constituent fiber of the nonwoven fabric is in a proportional relationship with the basis weight, and physical properties can be evaluated by converting the tensile strength by zero-span to the tensile strength per basis weight, so that the strength of constituent fibers of the nonwoven fabric can be evaluated by the tensile strength per certain number of constituent fibers of the nonwoven fabric.

The higher the sum of the tensile strengths by the zero-span per basis weight of the machine direction and cross machine direction of the nonwoven fabric, since it has a hardly mechanical strength cut and broken by an external force, the sum of the tensile strengths by the zero-span per basis weight of the machine direction and cross machine direction of the nonwoven fabric are more preferably 6.7N/50 mm or more, still more preferably 7.0N/50 mm or more. The upper limit of the sum of the tensile strengths by the zero-span per basis weight are not particularly limited, but about 20N/50 mm is suitable.

The "machine direction" in the present invention is a machine direction of the nonwoven fabric, and the "cross machine direction" is a width direction orthogonal to the machine direction.

The method of measuring the tensile strength by zero-span per basis weight is as follows.

(1) From the nonwoven fabric, nonwoven fabric samples are taken in rectangular shape of 200 mm in the machine direction and 50 mm in the cross-machine direction (nonwoven fabric samples in the machine direction). Similarly, nonwoven fabric samples are taken from the nonwoven fabric in rectangular shape of 50 mm in the machine direction and 200 mm in the cross-machine direction (nonwoven fabric samples in the cross-machine direction).

(2) The strength of the nonwoven fabric samples in the machine direction and nonwoven fabric samples in the cross-machine direction when pulled until the nonwoven fabric samples break are measured on a constant rate extension tensile tester (Orientec. Tensilon, initial grip spacing: 2 mm, pull rate: 100 mm/min). The measurements are made for each of three arbitrarily selected nonwoven fabric samples in the machine direction and nonwoven fabric samples in the cross-machine direction, and the arithmetic mean of each of the three is the tensile strength by zero-span (N/50 mm) in the machine direction and cross machine direction.

(3) The tensile strength by zero-span in the machine direction and the cross-machine direction obtained in (2) is divided by the basis weight (g/m$^2$) of the nonwoven fabric to obtain the tensile strength by zero-span per basis weight in the machine direction and the cross-machine direction. In addition, this "basis weight" refers to the basis weight obtained based on the methods specified in JIS P 8124 (Paper and board-Determination of grammage): 2011.

The polyolefin-based composite fusion fiber constituting the nonwoven fabric of the present invention is composed of the polyolefin-based resin having excellent chemical resistance. Further, this fiber has a fusion component on the surface of the fiber, and the nonwoven fabric structure is maintained by fusing the fusion component. This polyolefin-based composite fusion fiber contains a non-fusion component which does not fuse at the fusion temperature of the fusion component other than the fusion component, and since the fiber form is maintained by the non-fusion component even if the fusion component is fused, the polyolefin-based composite fusion fiber has mechanical strength which is hardly broken by an external force.

Although the ratio of the fusion component occupying the fiber surface (excluding both end portions) of the polyolefin-based composite fusing fiber is not particularly limited, as long as it is high, there are many fusion components which can participate in fusing, and can contribute to the morphological stability of the nonwoven fabric, and therefore, it is preferably 50% or more, more preferably 70% or more, still more preferably 90% or more, and most preferably only the fusion component (100%) constitutes the fiber surface (excluding both end portions).

The arrangement state of the fused component and the non-fused component of the polyolefin-based composite fusion fiber in the cross section may be, for example, a core-sheath shape, an eccentric core-sheath shape, a sea island shape, a side-by-side shape, an orange shape, or a multi-layered shape, and in particular, it is preferable that the fiber surface (excluding both end portions) be only composed of the fusion component (100%), the sheath-core shape, the eccentric shape, or the sea island shape.

Note that, although the volume ratio of the fusion component and the non-fusion component in the polyolefin-based composite fusion fiber is not particularly limited, it is preferable that (fusion component):(non-fusion component) =15:85 to 85:15, more preferably (fusion component):(non-fusion component)=20:80 to 70:30, and still more preferably (fusion component):(non-fusion component)=23:77 to 55:45, and still more preferably (Fusion component):(non-fusion component)=25:75 to 45:55 so as to contribute to the form stability of the nonwoven fabric.

In addition, although the fusion component may be lower in melting point than the non-fusion component, only the fusion component is fused, so that the fiber form of the polyolefin-based composite fusion fiber can be easily maintained, the melting point of the fusion component is preferably 10° C., or more lower than the melting point of the non-fusion component, more preferably 20° C., or lower than the melting point of the non-fusion component, and still more preferably 30° C., or lower than the melting point of the non-fusion component.

The polyolefin-based composite fusion fiber may be composed of any resin component as long as they are composed of the polyolefin-based resin, but may be, for example, polyethylene/polypropylene, polyethylene/polymethylpentene, polypropylene/polymethylpentene, a propylene copolymer/polymethylpentene, an ethylene-based copolymer/polymethylpentene, ethylene-based copolymer/polypropylene, low density polyethylene/high density polyethylene, and the like, when the polyolefin-based composite fusion fibers are composed of 2 types of resin components of a fusion component and a non-fusion component.

In particular, when the polyolefin-based composite fusion fiber having the Young's modulus of 60 cN/dtex or more is contained as the polyolefin-based composite fusion fiber, since the polyolefin-based composite fusion fiber is hardly deformed by pressure, the nonwoven fabric has mechanical strength which is hardly cut and broken by an external force, and also is preferable because the nonwoven fabric is hardly compressed by pressure.

The higher the Young's modulus of the polyolefin-based composite fusion fiber, since the more nonwoven fabric has mechanical strength hardly cut and broken by an external force, more preferably 65 cN/dtex or more, and still more preferably 70 cN/dtex or more. The upper limit of the Young's modulus is not particularly limited, but 110 cN/dtex is suitable.

The Young's modulus in the present invention means the value of the apparent Young's modulus calculated from the initial tensile resistivity measured by the method specified in JIS L 1015 (Test methods for man-made staple fibres): 2010, 8.11. Incidentally, the initial tensile resistance refers to the value measured by a constant speed tension type tester.

Further, when the polyolefin-based composite fusion fiber having the tensile strength of 5.0 cN/dtex or more is contained as the polyolefin-based composite fusion fiber, since the polyolefin-based composite fusion fiber is hardly deformed by pressure, it is preferable that the nonwoven fabric has mechanical strength which is hardly broken by an external force.

The higher the tensile strength of the polyolefin-based composite fusion fiber, the more the nonwoven fabric has mechanical strength, it is preferably 5.5N/dtex or more, more preferably 6.0 cN/dtex or more, and still more preferably 6.5 cN/dtex or more. The upper limit of the tensile strength is not particularly limited, but 50 cN/dtex is suitable.

Further, when the elongation of the polyolefin-based composite fusion fiber is high, the nonwoven fabric is moderately elongated even when pulled by an external force, and has mechanical strength which is hardly broken by an external force, so that the elongation of the polyolefin-based composite fusion fiber is preferably 15% or more, more preferably 20% or more, and still more preferably 25% or more. On the other hand, if the elongation of the polyolefin-based composite fusion fiber is too high, the nonwoven fabric tends to be elongated and the morphology stability may be deteriorated, so that it is preferably 35% or less, more preferably 32% or less, and still more preferably 30% or less.

Note that the tensile strength and elongation of the fibers in the present invention means a value measured by a method defined in JIS L 1015 (Test methods for man-made staple fibres): 2010, 8.7.1.

Although the polyolefin-based composite fusion fiber satisfying the Young's modulus, tensile strength, and/or elongation described above can be composed of the above-mentioned polyolefin-based resin, it is preferable that the polyolefin-based composite fusion fiber contains polypropylene which is relatively high in rigidity, hardly compressed by pressure, and easily maintains spaces of the nonwoven fabric. Further, it is preferable to contain polyethylene which is easily fused without fusing polypropylene.

Therefore, it is preferable that the polyolefin-based composite fusion fiber is composed of polyethylene/polypropylene.

The polypropylene constituting this polyolefin-based composite fusion fiber may be capable homopolymer of propylene or copolymer of propylene and α-olefin (e.g., ethylene. 1-buten, and the like). More specifically, an isotactic propylene homopolymer having crystallinity, an ethylene-propylene random copolymer having a small content of ethylene units, a propylene block copolymer composed of a homo portion composed of the propylene homopolymer and a copolymer portion composed of a relatively large content of ethylene-propylene random copolymer having a high content of ethylene units, and further, each homo portion or a copolymer portion in the propylene block copolymer can be a crystalline propylene-ethylene-α-olefin copolymer formed of a copolymer obtained by copolymerizing a α-olefin such as 1-buten. Among these, isotactic polypropylene homopolymer is suitable from the viewpoint of strength, and such polypropylene can be obtained by homopolymerization of propylene or copolymerization of propylene with other α-olefins using a Ziegler-Natta type catalyst, or the metallocene type catalyst, or the like.

The polyethylene which is one component of the polyolefin-based composite fusion fiber can be, for example, ethylene-based polymer such as high density, medium density, low density polyethylene or linear low-density polyethylene. Among these, high-density polyethylene is suitable because it can be made into the nonwoven fabric which is somewhat hard and which is strung with high-density polyethylene, and which can be the nonwoven fabric excellent in handleability.

The polyolefin-based composite fusion fiber which can be used in such the present invention can be obtained, for example, by stretching an unstretched yarn in a pressurized saturated water vapor as described in JP-A-11-350283 or JP-A-2002-180330.

Although there is no particular limitation on the average fiber diameter of the polyolefin-based composite fusion fiber, it is preferably 3 μm to 17 μm, more preferably 5 μm to 15 μm, and still more preferably 7 μm to 13 μm so that the polyolefin-based composite fusion fiber is uniformly dispersed and the mechanical strength of the nonwoven fabric is excellent. The "average fiber diameter" in the present invention refers to the number average fiber diameter of the fiber diameter of 50 fibers selected at random. The "fiber diameter" refers to the diameter of the fiber when the cross-sectional shape of the fiber is circular, and a diameter of the circle having the same area as the cross-sectional area is regarded as the fiber diameter when the cross-sectional shape is other than circular.

Further, although the fiber length of the polyolefin-based composite fusion fiber is not particularly limited, it is preferably 0.1 mm to 25 mm, more preferably 1 mm to 10 mm, and still more preferably 2 mm to 5 mm so that the polyolefin-based composite fusion fiber is uniformly dispersed and the mechanical strength of the nonwoven fabric is excellent. Note that the fiber length in the present invention means the length measured by the method defined in the B method (corrected staple diagram method) of JIS L 1015 (Test methods for man-made staple fibres): 2010, 8.4.

Note that the nonwoven fabric of the present invention may contain 2 or more kinds of polyolefin-based composite fusion fibers, which differ in 1 or more of the number of the resin components, the resin component, the Young's modulus, the tensile strength, the elongation, the average fiber diameter, the fiber length, and the like.

By such polyolefin-based composite fusion fibers are fused, so that the nonwoven fabric structure can be maintained, the polyolefin-based composite fusion fibers are preferably contained in the nonwoven fabric in the amount of 20 mass % or more, more preferably contained in the amount of 50 mass % or more, and still more preferably contained in the amount of 70 mass % or more.

When the nonwoven fabric of the present invention contains superfine fibers having the average fiber diameter of 4 μm or less in addition to the polyolefin-based composite fusion fibers as described above, it is preferable that the nonwoven fabric has a dense structure because it is excellent in various performances such as electrical insulation, separation performance, liquid retention, wiping property, and concealability.

As the average fiber diameter of this superfine fiber is smaller, the nonwoven fabric can adopt a denser structure, so that the average fiber diameter of the superfine fiber is more preferably 3 μm or less, and still more preferably 2 μm or less. The lower limit of the average fiber diameter of the superfine fibers is not particularly limited, but is suitably 0.1 μm.

It is noted that the fiber diameter of each of the superfine fibers is preferably substantially the same. This is because, when the fiber diameters of the respective superfine fibers are substantially the same, spaces having uniform sizes are easily formed, and various performances such as electrical insulating property, separation performance, liquid retention, wiping property, concealability, and the like of the nonwoven fabric is excellent. Specifically, it is preferable that a value (σ/d) obtained by dividing a standard deviation value (σ) of a fiber diameter distribution of superfine fibers by the average fiber diameter (d) of superfine fibers are 0.2 or less (preferably 0.18 or less). When all the fiber diameters of the superfine fibers are the same, the standard deviation value (σ) becomes 0, and therefore the lower limit value of this value (σ/d) is 0. The standard deviation value (σ) of the superfine fibers is a value calculated from the measured fiber diameter (X) of each of the n (100) superfine fibers by the following equation.

$$\text{Standard deviation} = \{(n\Sigma X^2 - (\Sigma X)^2)/n(n-1)\}^{1/2}$$

As a method of obtaining the superfine fiber of the present invention, for example, it can be obtained by dividing an external force type split fiber which is composed of 2 or more kinds of resin components and can be divided by an external force, or by dividing a chemical type splitting fiber which is composed of 2 or more kinds of resin components and can be divided by a chemical action. Examples of the external force capable of dividing the external force type dividing fiber include a fluid stream such as a water stream, a calender, a refiner, a pulper, a mixer, and a beater. On the other hand, chemical treatment includes, for example, remove of a resin component by a solvent and swelling of a resin component by a solvent. Among these, superfine fiber obtained by dividing a chemical type split fiber are suitable because they have substantially the same fiber diameter in the length direction and substantially the same fiber diameter even between a plurality of superfine fibers, and these superfine fibers are uniformly dispersed in the nonwoven fabric to form spaces having uniform sizes, and are excellent in various performances such as electrical insulating property, separation performance, liquid retention property, wiping property, and concealability of the nonwoven fabric.

Suitable chemical type splitting fibers include fiber composed of 2 or more kinds of resin components and having the sea-island shape in an arrangement state in the fiber cross section. Although such sea-island shape fibers can be produced by a mixed spinning method or a composite spinning method, individual superfine fibers composed of island components generated by removing sea components of sea-island shape fibers produced by a composite spinning method are suitable because they have substantially the same fiber diameter in the length direction and substantially the same fiber diameter even between a plurality of superfine fibers, and easily form spaces having uniform sizes, and various performances such as electrical insulation, separation performance, liquid retention, wiping property, and concealability of the nonwoven fabric are excellent. As will be described later, since it is preferable that the superfine fibers contain the polyolefin-based resin and/or the nylon-based resin, it is preferable that the island component of the chemical type split fiber contains the polyolefin-based resin and/or the nylon-based resin. In particular, the chemical type splitting fiber having an island component composed solely of the polyolefin-based resin component is preferable so as to be excellent in chemical resistance.

Although the resin component constituting this superfine fiber is not particularly limited, it is preferably composed of the chemical resistant resin component so as to be excellent in chemical resistance, and is preferably composed of 1 or 2 or more kinds of polyolefin-based resins such as polyethylene, polypropylene, and polymethylpentene, and nylon-based resins such as nylon 6, nylon 66, nylon 11, and nylon 12. Among these, it is preferable to include the polyolefin-based resin which is particularly excellent in chemical resistance, and in particular, polypropylene is relatively high in rigidity, and the superfine fiber containing polypropylene is difficult to compressed by pressure, and thus it is preferable to maintain spaces of the nonwoven fabric.

Note that the superfine fiber need not be composed of 1 kind of resin component, and may be composed of 2 or more kinds of resin components having different melting points. When superfine fibers composed of 2 or more kinds of resin components having different melting points (preferable melting point difference is 10° C., or more, more preferably 20° C., or more) are bonded by the resin component having the low melting point, it is suitable because it prevents displacement of superfine fibers, can maintain a dispersion state of superfine fibers, and is excellent in various performances such as electrical insulating property, separation performance, liquid retention, wiping property, and concealability of the nonwoven fabric. For example, the superfine fiber may be composed of polypropylene and polyethylene.

It is preferable that the superfine fiber is in a stretched state so as to be excellent in mechanical strength, hardly compressed even by pressure, and the nonwoven fabric containing superfine fibers is easily maintained in the nonwoven fabric form. This "stretched state" means that the fibers are mechanically stretched after the fiber is formed, and the fibers formed by the melt blowing method are stretched by the heated air, but are not mechanically stretched, so that they are not in the stretched state. Note that, if the external force type split fiber or the chemical type split fiber is mechanically stretched at the stage before splitting, the superfine fiber generated from the split fiber is in the stretched state.

Although there is no particular limitation on the fiber length of the superfine fiber of the present invention, it is preferably 0.1 mm to 25 mm, more preferably 1 mm to 10 mm, and still more preferably 2 mm to 5 mm so that the superfine fibers can be uniformly dispersed to form spaces having uniform size in the nonwoven fabric.

Note that, when a bundle of superfine fibers is present, the superfine fibers cannot be uniformly dispersed, and spaces having a uniform size cannot be formed in the nonwoven fabric, so that it is preferable that the superfine fibers do not exist in a state of a bundle and that the individual superfine fibers are in a dispersed state.

Such superfine fiber is uniformly dispersed, so that the nonwoven fabric is a dense structure, preferably contained in the nonwoven fabric in the amount of 5 mass % or more, more preferably contained in the amount of 10 mass % or more, and still more preferably contained in the amount of 15 mass % or more. On the other hand, if an amount of superfine fibers are too high, it is difficult to maintain the structure of the nonwoven fabric by fusion of the polyolefin-based composite fusion fibers, and also, since the mechanical strength of the nonwoven fabric may be weakened, it is preferably contained in an amount of 80 mass % or less, more preferably contained in an amount of 50 mass % or less, and still more preferably contained in an amount of 30 mass % or less.

The nonwoven fabric of the present invention is basically composed of only polyolefin-based composite fusion fiber as described above, or polyolefin-based composite fusion fiber and superfine fiber, but may include other fibers other than these fibers. For example, a non-fusion fiber having the average fiber diameter of more than 4.0 μm but not involved in fusion, single fusion fiber having the average fiber diameter of more than 4.0 μm and participating in fusion, but consisting of a single resin component can be included. It is preferable that non-fusion fiber and single fusion fiber have the average fiber diameter of more than 4.0 μm and not more than 17 μm so as to be uniformly dispersed. Further, it is preferable that the non-fusion fiber has a resin component having the melting point is higher by 10° C., or more than the melting point of the fusion component of the polyolefin-based composite fusion fiber on the fiber surface, and the single fusion fiber is preferably composed of a resin component having the melting point of ±10° C., of the fusion component of the polyolefin-based composite fusion fiber, and both of the non-fusion fiber and the single fusion fiber are preferably composed of the polyolefin-based resin similar to the polyolefin-based composite fusion fiber. Note that the non-fusion fiber may be composed of the polyolefin-based resin component having the tensile strength of 5.0 cN/dtex or more. Furthermore, it is preferable that the fiber length be between 0.01 mm and 25 mm so that both non-fusion and single fusion fiber can be uniformly dispersed. Incidentally, these non-fusion fiber and/or single fusion fiber so as not to impair the action of the polyolefin-based composite fusion fiber and the superfine fiber in the nonwoven fabric, even if contained it is up to 75 mass %.

The nonwoven fabric of the present invention maintains the nonwoven fabric form by fusing polyolefin-based composite fusion fibers. As described above, since the polyolefin-based composite fusion fiber itself is fused, even if pressure is applied to the nonwoven fabric, deviation of the polyolefin-based composite fusion fiber hardly occurs, so that the mechanical strength of the nonwoven fabric is excellent. Further, when the superfine fibers are also fused, it is suitable because the superfine fibers do not fall off from the nonwoven fabric or the nonwoven fabric does not fluff.

In particular, it is preferable that the nonwoven fabric of the present invention is bonding only by fusion of fibers (including polyolefin-based composite fusion fibers, optionally superfine fibers). This is because, when it is bonding only by fusion of fibers (particularly, polyolefin-based composite fusion fibers), there is little variation in fibers in the nonwoven fabric, which is suitable when used in various applications. For example, if it is bonding by entanglement other than fusion bonding, there is a tendency that through holes are formed from the front surface to the back surface of the nonwoven fabric by an action for entanglement (e.g., a fluid flow such as a water flow), but if it is bonding only by fusion bonding, the arrangement of fibers is not disturbed at the time of fusion bonding, so that the through holes are hardly formed. Note that, when the nonwoven fabric is produced, fibers may be entangled even if an entanglement process is not performed. For example, when a fiber web is formed by a dry laid method or a wet laid method, the fiber web can keep a form to some extent, so that at least fibers are in a state of being entangled with each other. However, this entanglement is considered to be non-entangled because it is not an entanglement that disturbs the placement of the fibers, as is the case with the water entanglement described above. As described above, the term "only by fusion of fibers" refers to a state in which fixing of fibers to each other after forming a fiber web is performed only by fusion.

The nonwoven fabric of the present invention preferably has the maximum pore diameter of 40 μm or less, more preferably 20 μm or less, and still more preferably 15 μm or less, so as to have a dense structure and to have a uniform texture. Further, the average pore diameter is not particularly limited, but is preferably 20 μm or less, more preferably 15 μm or less, and still more preferably 10 μm or less. This "maximum pore diameter" and "average pore diameter" refer to the values measured by the bubble point method using a porometer (manufactured by Coulter).

When the nonwoven fabric of the present invention has the 5% modulus strength in the machine direction of 30N/50 mm to 100N/50 mm, the nonwoven fabric has a certain degree of structural flexibility while ensuring a minimum mechanical strength, and tends not to be misaligned (e.g., unwound) when manufacturing the nonwoven fabric or when incorporating the nonwoven fabric into an apparatus. In other words, by having such the 5% modulus strength, it is possible to eliminate an adverse effect when a large number of polyolefin-based composite fusion fibers are used, to improve the productivity of the nonwoven fabric, and also to improve the handling property of the nonwoven fabric, which is preferable. Note that, as a reason for evaluating the 5% modulus strength in the "machine direction", an external force is applied in the machine direction when the nonwoven fabric is wound up during the production of the nonwoven fabric, and also, when the nonwoven fabric is incorporated into an instrument such as electrochemical devices or filter, the nonwoven fabric is pulled and incorporated in the machine direction.

The machine direction 5% modulus strength of the nonwoven fabric of the present invention is more preferably 32N/50 mm or more, and even more preferably 35N/50 mm or more, so as to ensure a minimum mechanical strength. On the other hand, by having a certain degree of structural flexibility, it is more preferably 95N/50 mm or less, and still more preferably 90N/50 mm or less, so as to hardly cause a shift (e.g., a winding deviation) during the manufacture of the nonwoven fabric.

Note that, although the average 5% modulus strength in the cross-machine direction orthogonal to the machine direction of the nonwoven fabric is not particularly limited, it is preferably 10N/50 mm or more, more preferably 15N/50 mm or more, and still more preferably 20N/50 mm or more. The upper limit is not particularly limited, but 150N/50 mm or less is practical.

The measurement method of the 5% modulus strength is as follows.
(1) From the nonwoven fabric, nonwoven fabric samples are taken in rectangular shape of 200 mm in the machine direction and 50 mm in the cross-machine direction (nonwoven fabric samples in the machine direction). Similarly, nonwoven fabric samples are taken from the nonwoven fabric in rectangular shape of 50 mm in the machine direction and 200 mm in the cross-machine direction (nonwoven fabric samples in the cross-machine direction).
(2) Nonwoven fabric samples in the machine direction and nonwoven fabric samples in the cross-machine direction are subjected to the constant rate extension tensile tester (Orientec. Tensilon, initial grip spacing: 100 mm, pull rate: 300 mm/min) to measure the strength (N/50 mm) when pulled 5 mm (5%). These measurements are made for each of three arbitrarily selected nonwoven fabric samples in the machine direction and nonwoven fabric samples in the cross-machine direction, and the arithmetic mean of each of the three is taken as 5% modulus strength in the machine and cross machine directions.

The machine direction tensile strength (MD) of the nonwoven fabric of the present invention is preferably 10N/50 mm or more, more preferably 30N/50 mm or more, and still more preferably 50N/50 mm or more, because the higher the tensile strength, the stronger the adhesive strength between the fibers and the better the mechanical strength. The upper limit of the tensile strength is not particularly limited, but 500N/50 mm or less is practical.

Note that, although the cross-machine direction tensile strength (CD) of the nonwoven fabric is not particularly limited, it is preferably 2N/50 mm or more, more preferably 5N/50 mm or more, and still more preferably 10N/50 mm or more. The upper limit of the tensile strength is not particularly limited, but 250N/50 mm or less is practical.

The method for measuring the tensile strength is as follows.
(1) From the nonwoven fabric, nonwoven fabric samples are taken in rectangular shape of 200 mm in the machine direction and 50 mm in the cross-machine direction (nonwoven fabric samples in the machine direction). Similarly, nonwoven fabric samples are taken from the nonwoven fabric in a rectangular shape of 50 mm in the machine direction and 200 mm in the cross-machine direction (nonwoven fabric samples in the cross-machine direction).
(2) Nonwoven fabric samples in the machine direction and nonwoven fabric samples in the cross-machine direction are subjected to the constant rate extension tensile tester (Orientec. Tensilon, initial grip spacing: 100 mm, pull rate: 300 mm/min) to determine maximum strength when pulled until these nonwoven samples break. The measurements are made for each of three arbitrarily selected nonwoven fabric samples in the machine direction and nonwoven fabric samples in the cross-machine direction, and the arithmetic mean of each of the three is taken as the machine direction and cross machine direction tensile strength (N/50 mm).

The aspect ratio of tensile strength (MD/CD) of the nonwoven fabric in the present invention, which is the ratio of machine direction tensile strength (MD) of the nonwoven fabric to the cross-machine direction tensile strength (CD) of the nonwoven fabric is higher, when external force is applied to the nonwoven fabric, the nonwoven fabric is not easily deformed or broken, and is easy to handle. On the other hand, if the aspect ratio of tensile strength (MD/CD) is too high, the constituent fibers of the nonwoven fabric are extremely oriented in one direction, and when external force is applied to the nonwoven fabric, the nonwoven fabric is easily collapsed in the direction of the orientation direction of the fibers and easily compressed in the thickness direction, for example, when the non-woven fabric is used as a separator for electrochemical devices, the burrs on the electrode plate of the electrochemical device tend to penetrate the nonwoven fabric and cause short-circuit of the electrochemical devices, and the liquid retention of the nonwoven fabric tends to be poor. The aspect ratio of tensile strength (MD/CD) of the nonwoven fabric in the present invention is preferably 1.2 to 5.3, more preferably 2.0 to 5.3, still more preferably 3.0 to 5.0, and still more preferably 3.5 to 4.8.

The smaller the basis weight is, the thinner the thickness of the nonwoven fabric, as a result, the ion conductivity, gas permeability, and liquid permeability of the nonwoven fabric are excellent, so that the basis weight of the nonwoven fabric of the present invention is preferably equal to or less than 60 g/m$^2$, more preferably equal to or less than 50 g/m$^2$, and still more preferably equal to or less than 40 g/m$^2$. The lower limit of the basis weight is preferably 4 g/m$^2$ or more so that the nonwoven fabric has excellent mechanical strength.

Similarly, the thickness of the nonwoven fabric of the present invention is preferably 150 μm or less, more preferably 100 μm or less, and still more preferably 80 μm or less, because the thinner the thickness, the better the ion conductivity, the gas permeability, and the liquid permeability. The lower limit of the thickness is preferably 5 μm or more so that the nonwoven fabric is excellent in mechanical strength. Note that this "thickness" refers to the measured value by the outer micrometer at the time of 4N load.

The nonwoven fabric of the present invention preferably has the porosity of 45% to 85%, more preferably 50% to 85%, still more preferably 55% to 80%, and still more preferably 60% to 70% so as to be excellent in various performances such as ion conductivity, gas permeability, liquid permeability, and liquid retention. The "porosity (P)" (unit: %) refers to the value obtained from the following formula.

$$P=100-(Fr_1+Fr_2+\ldots+Fr_n)$$

Here, $Fr_n$ represents the fill factor (unit: %) of the n components constituting the nonwoven fabric, and refers to the values obtained from the following equations.

$$Fr_n=\{(M\times Pr_n)/(T\times SG_n)\}\times 100$$

Here, M indicates the basis weight (unit: g/cm$^2$) of the nonwoven fabric. T indicates the thickness (unit: cm) of the nonwoven fabric. $Pr_n$ indicates the weight ratio of the n component in the nonwoven fabric, and $SG_n$ indicates the specific gravity (unit: g/cm$^3$) of the n component.

In the nonwoven fabric of the present invention, it is preferable that the needle type penetration resistance per basis weight of the nonwoven fabric, which is obtained by dividing the needle type penetration resistance of the nonwoven fabric by the basis weight of the nonwoven fabric, is 21 gf or more so as to be excellent in mechanical strength. As a result, for example, when the nonwoven fabric is used as a separator for electrochemical devices, short-circuit is less likely to occur in which burrs of an electrode plate of an electrochemical device penetrates the nonwoven fabric, and when the nonwoven fabric is used as filter mediums, foreign matter is less likely to puncture the filter medium constituting the filter, and holes are less likely to be formed. The reason for evaluating the penetration resistance of the "per basis weight" is that the physical properties can be evaluated by the penetration resistance per constant weight of the constituent fibers of the nonwoven fabric by converting per basis weight, and the strength of the constituent fibers of the nonwoven fabric can be evaluated.

The higher the needle type penetration resistance per basis weight of the nonwoven fabric, the more the nonwoven fabric has mechanical strength which is hardly broken by external force. Therefore, the needle type penetration resistance per basis weight of the nonwoven fabric is more preferably 22 gf or more, and still more preferably 23 gf or more.

The method of measuring the needle type penetration resistance is as follows.

First, one nonwoven fabric is placed on a support table having a cylindrical through hole (inner diameter: 11 mm) so as to cover the cylindrical through hole, and a fixing material having a cylindrical through hole (inner diameter: 11 mm) is placed on the nonwoven fabric so as to coincide with the center of the cylindrical through hole of the support table, thereby fixing the nonwoven fabric. Next, a needle (radius of curvature at the tip: 0.5 mm, diameter: 1 mm, length of protrusion from the jig: 2 cm) attached to a handy compressive tester (KES-G5, manufactured by Kato Tech) is longitudinally pierced into the nonwoven fabric at a rate of 0.1 cm/s, and the force required for the needle to penetrate is measured. This measurement is performed 10 times, and the arithmetic average value thereof is used as the needle type penetration resistance.

The needle type penetration resistance per basis weight is obtained by dividing the needle type penetration resistance measured by the above methods by the basis weight of the nonwoven fabric (g/m$^2$).

In the nonwoven fabric of the present invention, it is preferable that the needle type penetration resistance of the nonwoven fabric per basis weight and per average fiber diameter is 5.5 gf or more, which is obtained by dividing the needle type penetration resistance of the nonwoven fabric by the basis weight of the nonwoven fabric and the average fiber diameter of the fibers constituting the nonwoven fabric, so as to be excellent in mechanical strength. As a result, for example, when the nonwoven fabric is used as a separator for electrochemical devices, burrs of electrode plates of the electrochemical device do not easily penetrate the nonwoven fabric to cause short-circuit, and when the nonwoven fabric is used as a filter medium, even if foreign matter penetrates the filter medium constituting the filter, holes are hardly formed. The reason for evaluating the penetration resistance "per basis weight and per average fiber diameter" is that the physical properties can be evaluated in terms of the penetration resistance per basis weight and per average fiber diameter by converting them into the penetration resistance per basis weight and the influence on the penetration resistance due to factors related to the penetration resistance other than the average fiber diameter of the constituent fibers, for example, the bonding state of the constituent fibers, the orientation of the constituent fibers, the strength of the resin constituting the constituent fibers, and the like can be evaluated.

The higher the needle type penetration resistance per basis weight and per average fiber diameter of the nonwoven fabric, the more the nonwoven fabric has mechanical strength and less to be broken by external force, and therefore the needle type penetration resistance per basis weight and per average fiber diameter of the nonwoven fabric is more preferably 6.1 gf or more, and more preferably 6.3 gf or more.

The needle type penetration resistance per basis weight and per average fiber diameter is obtained by dividing the needle type penetration resistance measured by the above methods by the basis weight of the nonwoven fabric (g/m²) and the average fiber diameter (μm), thereby obtaining the needle type penetration resistance per basis weight and average fiber diameter.

The "average fiber diameter" (D) of the fibers constituting this nonwoven fabric refers to a value calculated from the following formula:

$$D = \frac{1}{\sqrt{\rho_{AV} \times \sum \frac{X_i}{100 \times D_i^2 \times \rho_i}}} \quad (1)$$

Here, $X_i$ means the percentage of each fiber present in the nonwoven fabric (unit: %), $D_i$ means the average fiber diameter of each fiber (unit: μm), $\rho_i$ means the specific gravity of the resins constituting each fiber, and $\rho_{AV}$ means the average specific gravity of each fiber constituting the fiber calculated from the following formula:

$$\rho_{AV} = \frac{1}{\sum \frac{X_i}{100 \times \rho_i}} \quad (2)$$

For example, in the nonwoven fabric, the polyolefin-based composite fusion fibers having the average fiber diameter of $D_A$ (μm) and the resin specific gravity of $\rho_A$ is $X_A$ mass %, and superfine fibers having the average fiber diameter of $D_B$ (μm) and the resin specific gravity of $\rho_B$ is $X_B$ mass % exists, the average fiber diameter of the nonwoven fabric configurations (D) is calculated from the following formula:

$$D = \frac{1}{\sqrt{\rho_{AV} \times \left(\frac{X_A}{100 \times D_A^2 \times \rho_A} + \frac{X_B}{100 \times D_B^2 \times \rho_B}\right)}} \quad (3)$$

Note that the average specific gravity of $\rho_{AV}$ is the value calculated from the following formula:

$$\rho_{AV} = \frac{1}{\frac{X_A}{100 \times \rho_A} + \frac{X_B}{100 \times \rho_B}} \quad (4)$$

It is preferable that the nonwoven fabric of the present invention has the cutter type penetration resistance per basis weight of the nonwoven fabric of 21 gf or more so as to be excellent in mechanical strength. Thus, for example, when the nonwoven fabric is used in a separator for electrochemical devices, it is difficult to cut with an electrode plate of the electrochemical devices, and when the nonwoven fabric is used for a wiper, for example, the nonwoven fabric is hardly cut when a sharp portion is wiped off. The higher the cutter type penetration resistance per basis weight of this nonwoven fabric, the more the nonwoven fabric has mechanical strength which is hardly cut by an external force. Therefore, the cutter type penetration resistance per basis weight of the nonwoven fabric is more preferably 23 gf or more, and even more preferably 25 gf or more.

The measurement method of the cutter type penetration resistance is as follows.

The nonwoven fabric is stacked to the total thickness of about 2 mm, and a stainless steel jig (thickness: 0.5 mm, tip angle: 60° attached to a handy compression tester (KES-G5, manufactured by Kato Tech) is erectly pierced into the top nonwoven fabric at the rate of 0.01 cm/s, and the force required to cut the top nonwoven fabric is measured. This measurement is performed 10 times, and the arithmetic average value thereof is defined as the cutter type penetration resistance.

Further, the cutter type penetration resistance per basis weight is obtained by dividing the cutter type penetration resistance measured by the above-mentioned methods by the basis weight of the nonwoven fabric (g/m²), thereby obtaining the cutter type penetration resistance per basis weight.

The nonwoven fabric of the present invention is preferably subjected to a hydrophilization treatment selected from among a sulfonation treatment, a fluorine gas treatment, a graft polymerization treatment of a vinyl monomer, a discharge treatment, a surfactant treatment, or a hydrophilic resin imparting treatment so as to impart or improve liquid retention. Among these, the sulfonation process, the fluorine gas treatment, the graft polymerization treatment of the vinyl monomer, or the discharge treatment is suitable because a decrease in hydrophilcity is small and the liquid retention property of the nonwoven fabric is excellent over a long period of time.

The nonwoven fabric of the present invention is preferably made of single layer structure so as to have excellent mechanical strength of the nonwoven fabric. By this "single layer structure" is meant that it is composed of the same fiber formulation.

It is preferable that the nonwoven fabric of the present invention contains inorganic particles because the specific surface area of the nonwoven fabric becomes large and the nonwoven fabric surface can have a dense structure and is excellent in various performances such as electrical insulation, separation performance, wiping property, and concealability.

Examples of the type of inorganic particles which can be used include inorganic oxides such as silicon oxide (silica), aluminum oxide (alumina), alumina-silica composite oxide, calcium oxide, titanium oxide, tin oxide, yttrium oxide, zirconium oxide, barium titanate, and tin-indium oxide.

The shape of the inorganic particles to be used can be appropriately selected from, for example, spherical (substantially spherical or true spherical), fibrous, needle-like, tabular, polygonal cubic, and feather-like.

Although the mean particle diameter of the inorganic particles which can be used in the present invention is appropriately adjusted, the mean particle diameter of the inorganic particles is preferably 10 μm or less, more preferably 2 μm or less, and still more preferably 1 μm or less, so as to be excellent in various performances such as electrical insulation, separation performance, liquid retention, wiping property, and concealability of the nonwoven fabric due to the uniform presence of inorganic particles in the spaces of the nonwoven fabric. Although there is no particular limitation on the lower limit of the mean particle diameter of the inorganic particles. 0.01 μm or more is realistic.

The mean particle diameter of the inorganic particles is obtained from particle diameter measurement data obtained from scattering intensities by subjecting the inorganic particles to a FPRA1000 manufactured by Otsuka Electronics Co., Ltd, and continuously measuring them by a dynamic light scattering method for 3 minutes. That is, the particle diameter measurement data obtained by the measurement is performed 5 times, and the particle diameter measurement data obtained by the measurement is arranged in the order of the narrow particle diameter distribution width, and the particle diameter $D_{50}$ (hereinafter, abbreviated as $D_{50}$) at the point of the cumulative value 50% of the inorganic particles in the data showing the third narrowest value of the particle diameter distribution width is defined as the mean particle diameter of the inorganic particles. Note that the dispersion liquid used for measurement is adjusted to a temperature of 25° C., and water at 25° C., is used as a blank for scattering intensity.

In addition, although the particle size distribution of the inorganic particles is appropriately adjusted, if a large number of inorganic particles having a large particle size exist, the inorganic particles may fall off and pinholes may be easily formed, and if a large number of inorganic particles having a small particle size exist, the spaces of the nonwoven fabric may be blocked.

Therefore, the particle size distribution of the inorganic particles is preferably within the ($D_{50}$/2) to ($D_{50}$×2) ranges. The particle size distribution of the inorganic particles is measured by the dynamic light scattering method described above, and is obtained from the particle size measurement data obtained from the measurement intensity.

In the case where the nonwoven fabric contains inorganic particles, as the ratio of the inorganic particles to the entire nonwoven fabric containing the inorganic particles is larger, the surface of the nonwoven fabric can have a denser structure and is superior in various performances such as electrical insulating property, separation property, wiping property, and concealability, so that the ratio of the inorganic particles to the entire nonwoven fabric containing the inorganic particles is preferably 10 mass % or more, more preferably 25 mass % or more, and still more preferably 30 mass % or more. On the other hand, if the ratio of the inorganic particles to the entire nonwoven fabric containing the inorganic particles is too large, the spaces of the nonwoven fabric may be filled by the inorganic particles, so that the gas permeability and the liquid permeability may be inferior, so that the ratio of the inorganic particles to the entire nonwoven fabric containing the inorganic particles is preferably 80 mass % or less, more preferably 70 mass % or less, and still more preferably 50 mass % or less.

The nonwoven fabric of the present invention can be used in various applications such as, for example, a separator for electrochemical devices, a filter for a gas/liquid, and a wiper. Among them, when used as the separator for electrochemical devices such as a primary battery, a secondary battery (a nickel metal hydride battery, a lithium ion battery, or the like), and a capacitor, the nonwoven fabric of the present invention has mechanical strength that is hardly cut and broken by an external force, the separator penetrates by burrs of the electrode plate of the electrochemical devices or short-circuit due to the separator is cut by the electrode plate of the electrochemical devices is particularly preferable because it is less likely to occur.

It is preferable that the separator for electrochemical devices using the nonwoven fabric of the present invention is excellent in electrolyte retention property which is hardly compressed even by pressure and can be resisted against pressure so as not to release the electrolyte which has been compressed and held by pressure. Such a state can be expressed by "thickness retention", and the thickness retention ratio is preferably 92% or more, more preferably 93% or more, and still more preferably 94% or more. The upper limit is 100%. The "thickness retention ratio (R: %)" refers to a percentage of a thickness ($T_{320}$) under a load of 320 kPa by a micrometer to a thickness ($T_{130}$) under a load of 130 kPa. That is, the value obtained by the following formula:

$$R=(T_{320}/T_{130})\times100 \qquad (5)$$

The reason why the evaluation is made based on the thickness at the time of the 130 kPa load and the thickness at the time of the 320 kPa load is that the load applied to the separator for electrochemical devices is about 130 kPa when the separator for electrochemical devices is incorporated into the electrochemical devices, and the load applied to the separator for electrochemical devices is about 320 kPa when the electrode expands at the time of charge and discharge of the electrochemical devices and pressure is applied by the separator for electrochemical devices.

The nonwoven fabric of the present invention can be produced, for example, as follows.

First, polyolefin-based composite fusion fibers as described above and, if necessary, superfine fibers are prepared.

These fibers are then formulated to form a fiber web. Although there is no particular limitation on the method of forming this fiber web, it can be formed by, for example, a dry laid method (e.g., a card method, an air lay method, or the like) or a wet laid method. Among these, it is preferable to form the nonwoven fabric in which fibers are uniformly dispersed to produce the nonwoven fabric with less uneven fibers by the wet laid method. The wet laid method, conventionally known methods, for example, a flat long-wire type, an inclined short-wire type, a cylindrical type, or a long-wire/cylindrical type. When 2 or more layers are to be combined, it is preferable to make the fiber web made of the same fiber blend so that the nonwoven fabric having a further structure can be produced.

Then, the fusion component of the polyolefin-based composite fusion fiber constituting this fiber web is fused (optionally, the fusion component of the superfine fiber is fused) to obtain the nonwoven fabric of the present invention. It is preferable to carry out only the fusion process of the fusion component of the fibers without performing entanglement or the like so that the arrangement of the fibers is not disturbed and the formation is not impaired. As for the fusion method, there is no particular limitation as long as it is fused by the fusion component of the polyolefin-based composite fusion fiber, and examples thereof include a method in which the fiber web is supported by a conveyor and hot air is blown, and a method in which heat is applied by a calendering process.

When a hydrophilization treatment is applied to the nonwoven fabric of the present invention, the hydrophilization treatment is subsequently performed. The hydrophilization treatment method is not particularly limited, and examples thereof include a sulfonation process, a fluorine gas treatment, a graft polymerization of a vinyl monomer, a surfactant treatment, a discharge treatment, and a hydrophilic resin imparting treatment.

When the thickness of the nonwoven fabric is not a desired thickness, it is preferable to adjust the thickness as appropriate. For example, it is preferable to adjust the thickness by a method such as passing between a pair of rolls. This thickness adjustment need not be performed once, but can be performed any number of times. For example, it can be carried out 1 time before the hydrophilization treatment after the fusion treatment and 1 time after the hydrophilization treatment.

In addition, when the nonwoven fabric containing inorganic particles is produced, a method of including inorganic particles in constituent fibers of the nonwoven fabric is not particularly limited, but may be, for example, a method of adhering and fixing inorganic particles to constituent fibers of the nonwoven fabric by a binder. Although a method of adhering and fixing inorganic particles to constituent fibers of the nonwoven fabric by a binder can be appropriately selected, for example.

1. A coating liquid (hereinafter sometimes referred to as a coating liquid) obtained by mixing a binder and an inorganic particle in a solvent or a dispersion medium is prepared, and the nonwoven fabric before containing inorganic particles is immersed in the coating liquid.
2. Spraying a coating liquid onto the nonwoven fabric before containing inorganic particles.
3. A coating method such as a kissing coater method using a gravure roll is used to apply a coating liquid on one main surface or both main surfaces of the nonwoven fabric before containing inorganic particles.

and removing a solvent or a dispersion medium in the coating liquid by drying.

The drying method for removing the solvent or the dispersion medium in the coating liquid can be appropriately selected, and for example, a near-infrared heater, a far-infrared heater, a method for removing the solvent or the dispersion medium by hot air or blown air, or the like can be used. In addition, a known method can be used, for example, a method in which the nonwoven fabric containing a coating liquid is left at room temperature (25° C.), a method in which the nonwoven fabric is exposed to a reduced pressure condition, a method in which a solvent or a dispersion medium is exposed to an atmosphere at a temperature higher than or equal to a temperature at which the solvent or the dispersion medium can volatilize.

EXAMPLES

Hereinafter, examples of the present invention will be described, but the present invention is not limited to the following examples.
(Polyolefin-Based Composite Fusion Fiber A)

A homopolypropylene (melting point: 168° C.) was used as a core component (non-fusion component), and a high-density polyethylene (melting point: 135° C.) was used as a sheath component (fusion component). The polyolefin-based composite fusion fiber A having the tensile strength of 6.5 cN/dtex, the Young's modulus of 75 cN/dtex, and the elongation of 25% (The high-density polyethylene was covered on the fiber surface except at both ends, the volume ratio of the core component and the sheath component=65: 35, average fiber diameter: 7.4 μm, fiber length: 5 mm, specific gravity: 0.94 g/cm$^3$) was prepared.
(Polyolefin-Based Composite Fusion Fiber B)

A homopolypropylene (melting point: 168° C.) was used as the core component (non-fusion component), and a high-density polyethylene (melting point: 135° C.) was used as the sheath component (fusion component). The polyolefin-based composite fusion fiber B having the tensile strength of 6.0 cN/dtex, the Young's modulus of 47 cN/dtex, and the elongation of 20% (The high-density polyethylene was covered on the fiber surface except at both ends, the volume ratio of the core component and the sheath component=60: 40, average fiber diameter: 10.5 μm, fiber length: 5 mm, specific gravity: 0.94 g/cm$^3$) was prepared.
(Polyolefin-Based Composite Fusion Fiber C)

A homopolypropylene (melting point: 168° C.) was used as the core component (non-fusion component), and a high-density polyethylene (melting point: 135° C.) was used as the sheath component (fusion component). The polyolefin-based composite fusion fiber C having the tensile strength of 5.5 cN/dtex, the Young's modulus of 57 cN/dtex, and the elongation of 10% (The high-density polyethylene was covered on the fiber surface except at both ends, the volume ratio of the core component and the sheath component=50: 50, average fiber diameter: 7.4 μm, fiber length: 5 mm, specific gravity: 0.94 g/cm$^3$) was prepared.
(Superfine Fiber)

In a sea component composed of a copolymerized polyester. 25 island components composed of polypropylene were present, and a sea-island type composite fiber (fineness: 1.65 dtex, fiber length: 2 mm) produced by a composite spinning method was immersed in a bath (temperature: 80° C.) composed of 10 mass % aqueous sodium hydroxide for 30 minutes, and a copolymerized polyester as the sea component of the sea-island type composite fiber was extracted and removed to obtain polypropylene superfine fibers (average fiber diameter: 2 μm, melting point: 172° C., fiber length: 2 mm, cross-sectional shape: circular, specific gravity: 0.91 g/cm$^3$). This polypropylene superfine fiber was not fibrillated and was in the stretching state, and moreover, each fiber had substantially the same diameter in the fiber axial direction.

Examples 1-7. Comparative Examples 1-2

Polyolefin-based composite fusion fibers A, B or C and polypropylene superfine fibers were dispersed in a slurry at a mass ratio shown in Table 1, and the fiber web in which individual polyolefin-based composite fusion fibers A, B or C and polypropylene superfine fibers were dispersed was formed by the wet method (flat long-wire typemethod), respectively.

Then, this fiber web was supported by the conveyor, while conveying the fiber web in close contact with the conveyor by suction from below the conveyor, blowing hot air at a temperature of 139° C., for 10 seconds to the fiber web, the heat treatment under no pressure to pass a sufficient amount of hot air carried out by an air-through method, at the same time drying of the fiber web polyolefin-based composite fusion fibers A, B or C only high-density polyethylene components were fused to form the fused fiber web.

Then, the fused fiber webs of Examples 1, 3, 6, 7 and Comparative Example 1 were subjected to plasma treatment to form nonwoven fabric subjected to hydrophilization treatment.

The fused fiber webs of Examples 2 and 5 and Comparative Example 2 were subjected to sulfonation treatment with fuming sulfuric acid (15% SO$_3$ solution) at the temperature of 60° C., thereby forming nonwoven fabric subjected to hydrophilization treatment.

The fused fiber web of Example 4 was subjected to fluorine gas treatment to form nonwoven fabric subjected to hydrophilization treatment.

The fiber composition, the hydrophilization treatment method, the average fiber diameter, the basis weight, the thickness, the apparent density (the value obtained by dividing the basis weight by the thickness), and the porosity of the nonwoven fabric of the examples and comparative examples are shown in Table 1 below.

TABLE 1

|  | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Polyolefin-based composite fusion fiber A | | 75% | 75% | 80% | 80% | 80% | 60% | 80% | 0% | 0% |
| Polyolefin-based composite fusion fiber B | | 0% | 0% | 0% | 0% | 0% | 0% | 0% | 75% | 0% |
| Polyolefin-based composite fusion fiber C | | 0% | 0% | 0% | 0% | 0% | 0% | 0% | 0% | 75% |
| Ultrafine fiber | | 25% | 25% | 20% | 20% | 20% | 40% | 20% | 25% | 25% |
| Hydrophilic treatment | | Plasma | Sulfonation | Plasma | Fluorine Gas | Sulfonation | Plasma | Plasma | Plasma | Sulfonation |
| Average fiber diameter | μm | 3.6 | 3.6 | 3.9 | 3.9 | 3.9 | 3.0 | 3.9 | 3.8 | 3.6 |
| Basis weight | g/m² | 32.9 | 35.4 | 32.5 | 25.0 | 30.0 | 24.9 | 32.5 | 33.1 | 35.0 |
| Thickness | μm | 76 | 80 | 73 | 69 | 140 | 51 | 73 | 70 | 80 |
| Apparent density | g/cm³ | 0.43 | 0.44 | 0.45 | 0.36 | 0.21 | 0.49 | 0.45 | 0.47 | 0.44 |
| Porosity | % | 54 | 53 | 53 | 61 | 77 | 48 | 53 | 50 | 53 |

Further, by the method described above, the sum of the tensile strength by zero-span per basis weight in the machine and the cross machine directions, 5% modulus strength in the machine and the cross machine directions, tensile strength in the machine and the cross machine directions (MD, CD), The aspect ratio of tensile strength (MD/CD), the maximum pore diameter, the average pore diameter, the thickness retention ratio, the needle type/cutter type penetration resistance per basis weight, the needle type penetration resistance per basis weight and per average fiber diameter were measured, and the liquid retention ratio under pressure was measured to evaluate the physical properties of the nonwoven fabric by the following method.

(Measurement of the Liquid Retention Ratio Under Pressure)

First, test specimens were prepared by cutting the nonwoven fabrics into circles having diameters of 30 mm, and after water equilibration was achieved at temperatures of 20° C., and 65% relative humidity, the weight ($M_0$) of each of the test specimens were measured.

Next, the test specimens were immersed in a Potassium Hydroxide solution having a specific gravity of 1.3 (20° C.) for 1 hours so as to replace air with the Potassium Hydroxide solution, and the Potassium Hydroxide solution was held.

Next, this test specimens were sandwiched by three filter papers (diameters: 30 mm) each in the upper and lower directions, and after a pressure of 5.7 MPa was applied for 30 seconds by a pressure pump, the weight ($M_1$) of the test piece was measured.

Then, the liquid retention ratio under pressure was obtained by the following formula. This measurement was performed on four test pieces of one separator, and the arithmetic average thereof was set as the liquid retention ratio under pressure (Rp, unit: %).

$$Rp = [(M_1 - M_0)/M_0] \times 100$$

The results of evaluation of physical properties of the nonwoven fabric are shown in Table 2 below.

TABLE 2

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Sum of the tensile strengths by zero-span per basis weight in the machine and the cross machine directions | N/50 mm | 7.2 | 7.3 | 7.4 | 7.4 | 7.3 | 6.5 | 7.4 | 6.4 | 6.2 |
| 5% modulus strength in the machine direction | N/50 mm | 63 | 68 | 64 | 64 | 59 | 60 | 70 | 66 | 62 |
| 5% modulus strength in the cross machine direction | N/50 mm | 21 | 20 | 20 | 20 | 38 | 14 | 16 | 24 | 19 |
| Tensile strength in the machine direction (MD) | N/50 mm | 118 | 132 | 124 | 118 | 115 | 80 | 135 | 131 | 134 |
| Tensile strength in the cross machine direction (CD) | N/50 mm | 30 | 37 | 32 | 29 | 30 | 17 | 25 | 38 | 55 |
| The aspect ratio of tensile strength (MD/CD) | | 3.9 | 3.6 | 3.9 | 4.0 | 3.9 | 4.7 | 5.4 | 3.5 | 2.4 |
| Maximum pore diameter | μm | 10.6 | 11.5 | 11.5 | 17.8 | 32.0 | 5.9 | 10.5 | 11.1 | 11.0 |
| Average pore diameter | μm | 7.1 | 7.8 | 7.8 | 11.0 | 18.0 | 4.1 | 6.8 | 7.3 | 7.5 |
| Thickness retntion ratio | % | 94 | 94 | 95 | 94 | 95 | 96 | 90 | 91 | 90 |
| Needle type penetrate resistance | gf | 825 | 825 | 805 | 630 | 690 | 530 | 650 | 675 | 600 |
| Cutter type penetrate resistance | gf | 975 | 975 | 955 | 930 | 920 | 855 | 925 | 650 | 600 |
| Needle type penetrate resistance per basis weight | gf | 25 | 23 | 25 | 25 | 23 | 21 | 20 | 20 | 17 |
| Needle type penetrate resistance per basis weight per average fiber diameter | gf | 7.0 | 6.5 | 6.4 | 6.5 | 6.4 | 7.0 | 5.1 | 5.3 | 4.8 |

TABLE 2-continued

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Cutter type penetrate resistance per basis weight | gf | 30 | 28 | 29 | 37 | 31 | 34 | 29 | 20 | 17 |
| Liquid retention ratio under pressure | % | 9.6 | 9.0 | 8.6 | 8.3 | 11.3 | 11.5 | 7.5 | 8.0 | 8.1 |

Comparison between Example 1 and Comparative Example 1, comparison between Example 2 and Comparative Example 2, and results of Examples 3 to 7 revealed that since the sum of the tensile strength per basis weight in the machine and the cross machine directions by zero-span is 6.5N/50 mm or more, the penetration resistances by needle and cutter are improved, and therefore, the nonwoven fabric of the present invention is excellent in mechanical strength, and when the nonwoven fabric of the present invention is used as a separator for electrochemical devices, short-circuit due to penetration by a burr of the electrode plate of the electrochemical device or cutting of the separator by the electrode plate of the electrochemical device is hardly caused. Further, by using the polyolefin-based composite fusion fiber having the high Young's modulus, the needle type/cutter type penetration resistance is improved, the mechanical strength of the nonwoven fabric is excellent, and the nonwoven fabric is hardly collapsed by the pressure, and thus the thickness retention ratio is high, so that it has been found that the nonwoven fabric of the present invention is excellent in liquid retention property. Further, by using the polyolefin-based composite fusion fiber having high elongation, it was found that the needle type/cutter type penetration resistance is improved, and the mechanical strength of the nonwoven fabric is excellent. Note that, in the nonwoven fabric of Example 7, the thickness retention ratio and the liquid retention ratio under pressure are lower than those of the nonwoven fabric of Example 3 in which the fiber blending and the hydrophilization treatment are the same, but the reason for this was considered to be that the nonwoven fabric of Example 7 tends to compressed in the thickness direction compared with the nonwoven fabric of Example 3 in which the constituent fibers are arranged at a relatively random due to the fact that the constituent fibers of the nonwoven fabric of Example 7 are arranged in one direction.

Further, from the comparison of Example 3 and Example 7, it was found that, when the aspect ratio of tensile strength (MD/CD) of the nonwoven fabric is 5.3 or less, the needle type penetration resistance of the nonwoven fabric is improved and the mechanical strength is excellent, and when the nonwoven fabric of the present invention is used as a separator for electrochemical devices, short-circuit due to penetration by the burr of the electrode plate of the electrochemical devices hardly occurs.

Further, the nonwoven fabrics of Examples 1 to 6 were having high penetration resistance per basis weight and per average fiber diameter and excellent mechanical strength compared with the nonwoven fabrics of Examples 7 and of Comparative Examples 1 to 2. The reason for this was considered to be related to the orientation of the constituent fibers of the nonwoven fabric, the strength of the resin constituting the constituent fibers of the nonwoven fabric, and the like.

INDUSTRIAL APPLICABILITY

Since the nonwoven fabric of the present invention is excellent in mechanical strength, it can be used in various applications such as, for example, a separator for electrochemical devices, a filter for a gas/liquid, and a wiper. Among them, when the nonwoven fabric of the present invention is used as the separator for the electrochemical devices such as a primary battery, a secondary battery (nickel metal hydride battery, a nickel cadmium battery, a lithium ion battery, etc.), and a capacitor is particularly preferable because it is less likely to occur the short-circuit due to the separator is penetrated by burrs of the electrode plate of the electrochemical devices or the separator is cut by the electrode plate of the electrochemical devices. When the nonwoven fabric of the present invention is used for the separator for the electrochemical devices, the electrode structure of the electrochemical devices may be a wound type, a laminated type, or any other shape.

The invention claimed is:

1. A nonwoven fabric in which the fabric fibers consist of polyolefin-based composite fusion fibers provided with a fusion component on the fiber surface, and polypropylene ultrafine fibers having the average fiber diameter of 2 µm or less, and the value ($\sigma$/d) obtained by dividing a standard deviation value ($\sigma$) of a fiber diameter distribution of the ultrafine fibers by the average fiber diameter (d) of the ultrafine fibers is 0.2 or less;
   wherein the composite fusion fibers are fused,
   the average fiber diameter of the polyolefin-based composite fusion fibers is 3 µm to 7.4 µm,
   the content of the polyolefin-based composite fusion fibers is 60 mass % or more in the nonwoven fabric,
   the content of the polypropylene ultrafine fibers is 20 mass % or more in the nonwoven fabric,
   the basis of the nonwoven fabric is 40 g/m$^2$ or less,
   the sum of the tensile strength by zero-span per basis weight in the longitudinal direction and the lateral direction is 6.5N/50 mm or more,
   the Young's modulus of the polyolefin-based composite fusion fiber is 60 cN/dtex or more,
   the ratio of the machine direction tensile strength (MD) of the nonwoven fabric to the cross-machine direction tensile strength (CD) of the nonwoven fabric is 2.0 to 5.3,
   the needle type penetration resistance per basis weight and per average fiber diameter of the nonwoven fabric is 6.3 gram-force or more, and
   the nonwoven fabric optionally comprises inorganic particles.

2. The nonwoven fabric according to claim 1, wherein the tensile strength of the polyolefin-based composite fusion fiber is 5.0 cN/dtex or more.

3. The nonwoven fabric according to claim 1, wherein the elongation of the polyolefin-based composite fusion fiber is 15% to 35%.

4. The nonwoven fabric according to claim 1, wherein the maximum pore diameter of the nonwoven fabric is 40 μm or less.

5. The nonwoven fabric according to claim 1, wherein the longitudinal 5% modulus strength of the nonwoven fabric is 30N/50 mm to 100N/50 mm.

6. The nonwoven fabric according to claim 1, wherein the porosity of the nonwoven fabric is 45% to 85%.

7. The nonwoven fabric according to claim 1, wherein the needle type penetration resistance per basis weight of the nonwoven fabric is 21 gram-force or more.

8. The nonwoven fabric according to claim 1, wherein the cutter type penetration resistance per basis weight of the nonwoven fabric is 21 gram-force or more.

9. The nonwoven fabric according to claim 1, wherein the nonwoven fabric comprises inorganic particles.

10. A separator for electrochemical devices comprising the nonwoven fabric according to claim 1.

11. The separator for electrochemical devices according to claim 10, wherein the thickness retention ratio is 92% or more.

12. The nonwoven fabric according to claim 1, wherein the ratio is 3.0 to 5.0.

13. The nonwoven fabric according to claim 1, wherein the ratio is 3.5 to 4.8.

14. The nonwoven fabric according to claim 1, wherein the Young's modulus is 70 cN/dtex or more.

\* \* \* \* \*